(12) United States Patent
Anderson et al.

(10) Patent No.: US 8,432,802 B2
(45) Date of Patent: Apr. 30, 2013

(54) ENCAPSULATING FRAME OF GRAPHICS DATA FOR REPLAY

(75) Inventors: Michael David Anderson, Redmond, WA (US); Paul L. Bleisch, Sammamish, WA (US); David Aronson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 11/186,727

(22) Filed: Jul. 20, 2005

(65) Prior Publication Data

US 2007/0040939 A1 Feb. 22, 2007

(51) Int. Cl.
*H04L 12/26* (2006.01)

(52) U.S. Cl.
USPC ........................................................ 370/235

(58) Field of Classification Search .................... 463/43, 463/1; 348/200, 201, 207, 208, 230, 326, 348/353; 725/74, 135, 143, 148, 149, 151, 725/153; 715/200, 273, 972, 976–977; 719/313, 719/315, 316, 328, 331–332; 370/229, 230–231, 370/235, 236, 241, 252, 351; 717/100, 106, 717/108, 162, 165
See application file for complete search history.

(56) References Cited

U.S. PATENT DOCUMENTS

2003/0197703 A1* 10/2003 Takakura et al. ............. 345/473
2005/0256895 A1* 11/2005 Dussault ...................... 707/102

* cited by examiner

*Primary Examiner* — Omar Ghowrwal
(74) *Attorney, Agent, or Firm* — Woodcock Washburn LLP (57) ABSTRACT

An application renders a visual simulation to a display as a series of visual frames according to a plurality of calls. Each frame contains objects. A particular frame n of the simulation is captured for re-rendering. An identification of the frame n to be captured is received, a run file for the identified frame n is created, and for the frame n each call issued in connection with such frame n by the application is captured. For each issued call in order, all establishing calls necessary to establish state for the issued call are firstly written to the run file, and the issued call is then secondly written to the run file. Thus, the run file as produced represents an ordered list of calls that may be executed by an executable on any of a plurality of computing devices to re-render the frame independent from the application.

20 Claims, 4 Drawing Sheets

ENCAPSULATING FRAME OF GRAPHICS DATA FOR REPLAY

TECHNICAL FIELD

The present invention relates to a method that allows a frame of graphics data to be encapsulated into a form such that the frame may be reconstructed or 'replayed' without reference to any previous frame of the graphics data. More particularly, the present invention relates to such a method whereby the frame is encapsulated into a form that contains all necessary calls for rendering the frame and that minimizes if not eliminates other calls not relevant to the frame.

BACKGROUND OF THE INVENTION

As may be appreciated, in a computer game or visual computer simulation or the like (hereinafter, 'game'), visual graphics for the game are rendered on a continuous basis as a series of visual frames. In connection with any particular frame, then, an object may be created to be displayed in connection with the frame, an object may be populated with some sort of fill or the like, etc. Likewise, in connection with any particular frame, an object previously created and/or populated may be modified. As should be appreciated, a particular frame may have anywhere from one to ten thousand objects or more associated therewith, and in connection with such frame none, some, many, most, or all of such objects may be created, populated, and/or otherwise changed. Generally, any change to an object in a frame may be achieved by way of one or more computer-type calls with respect to such object. Thus, it is not inconceivable that thousands or tens of thousand of calls can be made in connection with any particular frame of a game.

As may be appreciated, many obstacles exist in developing the visual graphics for a game. Such obstacles include, among other things, performance in terms of speed in rendering each frame and the like, correctness of each rendered frame, and understanding how resources are best employed in an efficient manner. Moreover, such obstacles may be compounded if the game is to be instantiated on any of several types of hardware configurations and software configurations, where each such configuration can potentially present unique rendering issues.

In dealing with such obstacles, it is at times useful to be able to capture a particular rendered frame, and in particular capture such frame in a manner so that the frame can be re-rendered on each of several computing devices, each having a particular hardware configuration and software configuration. Moreover, it would be useful in doing so to be able to re-render the particular frame on a particular computing device without the aid of the application that initially rendered the frame. Thus, the computing device need not have the application installed thereon, and the rendering on the computing device is independent of the application.

Recognizing that any particular frame may rely on previous frames both to create and populate objects relevant to the particular frame, one possible method of capturing a rendered frame is to capture and store all calls made in connection with all previous frames and also all calls made by the particular frame. However, it is to be appreciated that the sheer volume of all of such calls may become enormous, especially if the particular frame is serially positioned well into the game, and such enormity may pose issues both in storage and transmitting of the calls for the frame.

Accordingly, a need exists for a method by which a particular rendered frame may be captured and re-rendered in an expeditious and efficient manner, and without the aid of the application that initially rendered the frame. Also, a need exists for such a method by which such capturing and re-rendering may be achieved without capturing all calls made in connection with all previous frames. In particular, a need exists for a method of identifying and storing only those calls made in connection with previous frames that are needed in connection with the particular frame, as well as the calls made in connection with the particular frame. Thus, the particular frame may be re-rendered by playing a run file containing such needed calls to re-construct the environment of the particular frame, and also containing the calls made in connection with the particular frame. As should be understood, such a run file may be played without the application on one or more computing devices to identify performance, correctness, and understanding issues as between different hardware configurations and software configurations.

SUMMARY OF THE INVENTION

The aforementioned needs are satisfied at least in part by the present invention in which a method is provided in combination with an application running on a computing device and rendering a visual simulation to a display of the computing device. The application renders the simulation as a series of visual frames according to a plurality of calls. Each frame has one or more visual and non-visual objects associated therewith.

The method captures a particular frame n of the simulation for re-rendering, and comprises receiving an identification of the frame n to be captured, creating a run file for the identified frame n, and capturing for the frame n each call issued in connection with such frame n by the application. For each issued call in order, all establishing calls necessary to establish state for the issued call are firstly written to the run file, and the issued call is then secondly written to the run file. Thus, the run file as produced represents an ordered list of calls that may be executed by an executable on any of a plurality of computing devices to re-render the frame independent from the application.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
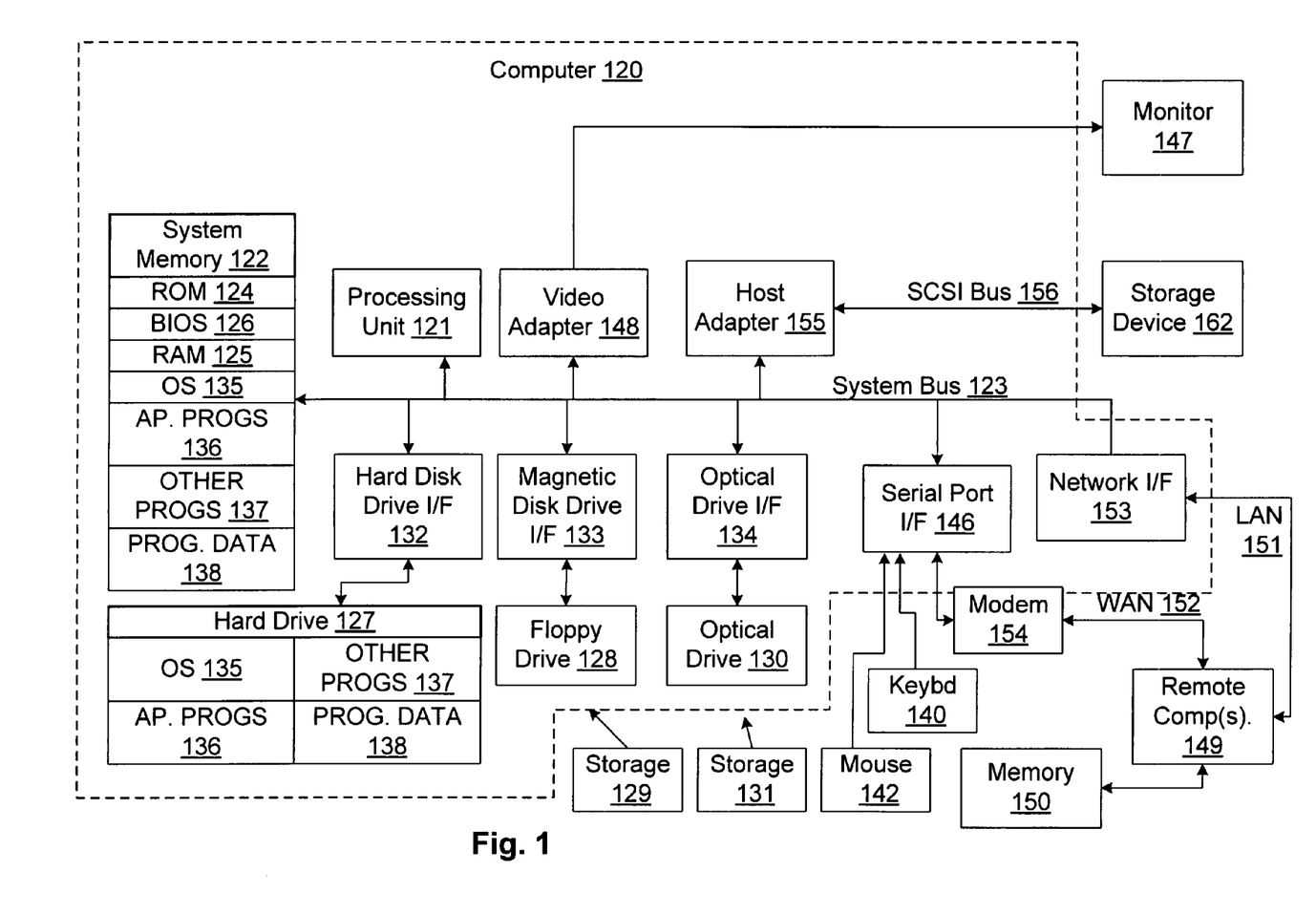
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Encapsulating Single Frame of Graphics Data for Replay

Prior to the present invention, a developer developing visual graphics for an application such as a computer game or visual computer simulation or the like (hereinafter, 'game') could cache the entire run of frames as outputted from the application, and then play back each frame in sequential order from the beginning. Of course, such an approach is cumbersome and problematic, especially if the developer is focusing on a particular frame. In particular, the developer is required to re-run the application many times in order to step through to the problematic frame. Alternatively, the developer could connect a debugger to the application and break into the run thereof the application. However, to do so, the application must be running on a particular machine at the time with the source code available to the developer at the time of debugging.

The present invention, resolves such issues by allowing a developer to focus on a particular frame as output by an application without the need to cache the entire series of frames from such application, and without the need for a debugger. In addition, the present invention allows the particular frame to be re-rendered on any of several configurations of hardware and/or software without the presence of the application. Thus, the present invention reduces the time needed to re-render a frame and allows a developer to investigate frame issues that arise across configurations, among other things.

With the present invention, a minimal representation of a particular frame is captured based on all necessary calls necessary to re-render the frame, and without other superfluous calls that are deemed irrelevant to the particular frame. The minimal representation of the particular frame is of a convenient size to be transmitted to multiple computing devices for further testing and analysis across multiple configurations as may be necessary.

Figure 2:
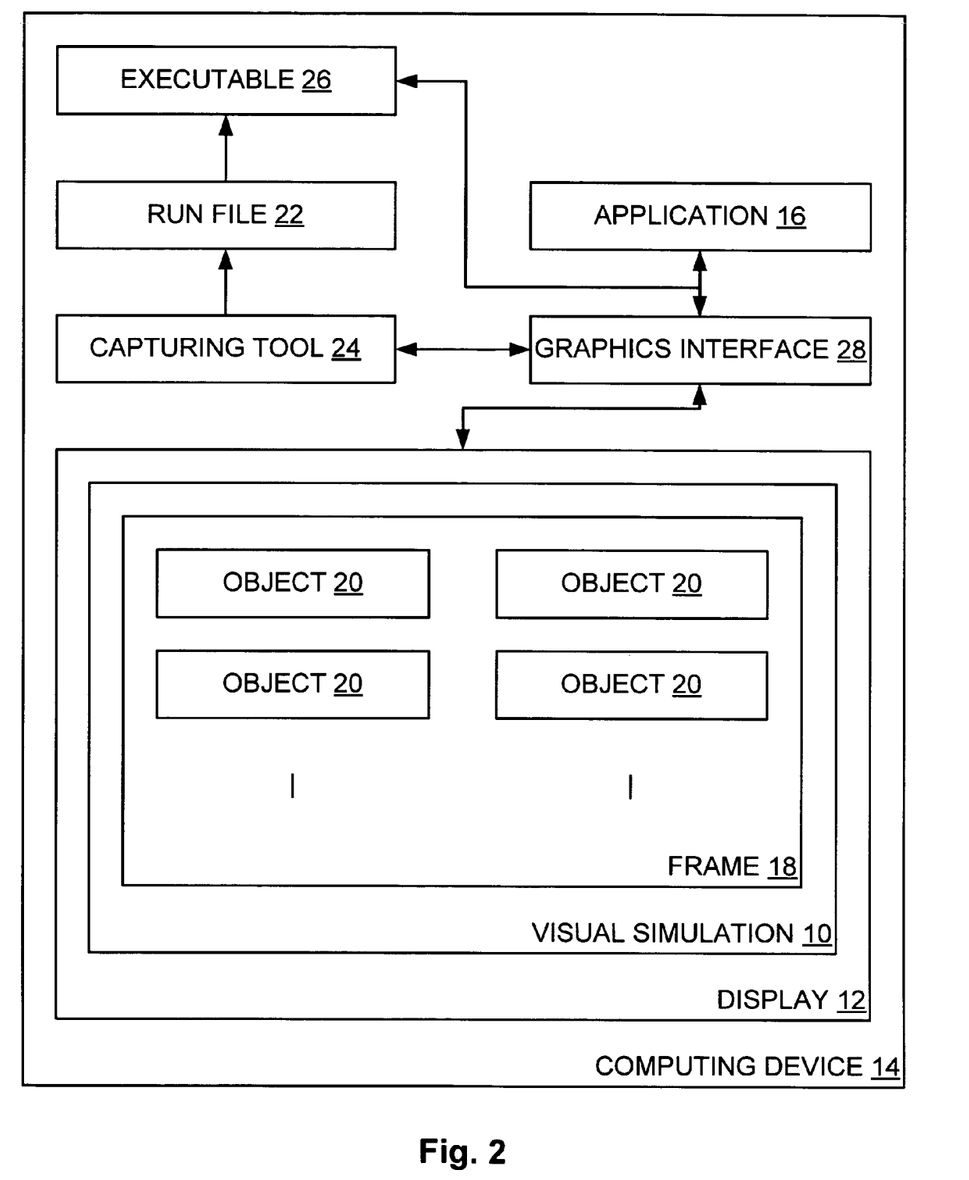
FIG. 2 is a block diagram showing a computing device upon which an application is rendering a visual presentation as a series of frames, where each frame includes a plurality of associated objects.

Referring now to FIG. 2, it is seen that in general a visual simulation 10 such as a game is output on a display 12 of a computing device 14 upon which is running an application 16 generating the simulation 10. As may be appreciated, such simulation 10 is rendered on a continuous basis as a series of visual frames 18, where each frame 18 contains one or more visual and non-visual objects 20, and in fact typically may contain on the order of thousands of objects 20 or more. Typically, each visual object 20 as displayed has a particular size and shape, has a particular location within the frame 18, and is populated with a particular fill. Such fill may be defined according to a particular color, a particular pattern, a particular transparency, and the like. As may be appreciated, a non-visual object 20 in connection with a frame 18 includes non-visual information used in connection with the frame 18, such as for example a list, a database, a table, a set of formulas, etc.

Typically, although not necessarily, the application 16 and perhaps other applications render information to be displayed on the display 12 of the computing device 14 by way of a more-or-less standard graphics interface 28. Employing such a graphics interface 28 is known or should be apparent to the relevant public and therefore need not be set forth herein in any detail. Accordingly, any appropriate graphics interface 28 may be employed without departing from the spirit and scope of the present invention.

As should be appreciated, visual and/or non-visual objects 20 as employed by a graphics interface 28 may be used to encapsulate state information. Thus, rather than issuing all rendering state information completely by way of the parameters of a call to the graphics interface 28, it is instead typical to first make a call to create an object 20 that represents such state information, perhaps in the form of a texture map, a vertex buffer, a pixel shader, and the like. Subsequent calls may alter the state of the object 20, and the graphics interface 20 retains such altered state information in the object 20. A 'Draw' call, rather than referring to rendering state directly, instead generally refer to one or more previously-created objects 20 One example of such a Draw call may be "Draw object X using texture Y and the render state in device Z". Objects 20 may for example be instances derived from available classes, and calls may be method invocations against those instances. Typically, only a relatively small number of the objects 20 in existence as of a particular frame may actually be required to render such frame n, so for efficiency reasons it is important to only record those required objects 20 and no others.

Typically, the application 16 does not render each frame 18 anew. Instead, the application 16 in connection with a particular frame 18 may issue one or more calls to create and populate an object 20 as necessary, and may also issue one or more calls to modify an object 20 already present from a previous frame 18. Generally, developing such a visual simulation 10 is known or should be apparent to the relevant public and therefore need not be set forth herein in any detail. Accordingly, and particular method of developing such a simulation 10 may be employed without departing from the spirit and scope of the present invention.

As should be appreciated, then, a particular frame n cannot be rendered without having first rendering at least some of the calls submitted for frames 1 through n-1. That is, for any particular frame 18, the objects 20 therein are the result of cumulative changes accumulated over previous frames 18 as represented by a sequence of calls issued to make such changes. With the present invention, then, the sequence of calls made before frame n is observed and recorded to provide at least enough information to set up the system state for frame n, and a minimum call sequence can then be derived from the recorded sequence of calls to represent the frame n.

Generally, to capture a particular frame n according to the minimum call sequence representative of such frame n, the following information must be stored:
  Which objects 20 are used in frame n?
  How is each such object 20 created?
  How is each such object populated at the beginning of frame n?
  What calls are made in frame n?

Note that, at least conceptually, creating objects 20 should be dealt with separately from populating such objects 20. In particular, when re-rendering a frame 18 multiple times, the objects 20 thereof can be re-used rather than re-created. However, before re-rendering the frame 18, the contents of each object 20 may need to be refilled if altered or 'dirtied' during the previous re-rendering of the frame 18. Note too that if an object 20 is destroyed during the frame 18, such object 20 must be re-created during the next re-rendering. Note finally that the present invention is not primarily concerned with capturing the calls made in frame n since such capturing merely requires recording the sequence of calls. Instead, the present invention is primarily concerned with establishing state for the frame n prior to rendering same, where such state is represented by the aforementioned minimum sequence of calls necessary to create and populate all objects 20 present immediately after frame n-1 and immediately before frame n.

Note that object creation as used herein may be interpreted to refer to both creation and acquisition, although such creation and such acquisition are not necessarily one and the same. For example, an object 20 may be created by one call and acquired by another call, such as in the case where the object 20 is created as a secondary effect of creating another object 20. Nevertheless, creating should be interpreted herein as both creating and acquiring unless circumstances dictate otherwise.

The aforementioned example points out that creating an object 20 can often require the presence of other objects 20. Thus, an object 20 can have one or more prerequisite objects 20, and creating the object 20 requires creation of all prerequisite objects 20 thereof. More to the point, to capture creation of an object 20 requires not only capturing the call that created such object 20 but all calls that created all prerequisite objects 20 of such object 20. Moreover, to capture the calls that created the prerequisite objects 20 of an object 20, one must first know what objects 20 are in fact prerequisite objects 20 of such object 20.

Correspondingly, populating an object 20 can often require the presence of other objects 20. Thus, and as before, populating an object 20 requires creation of all prerequisite objects 20 that are necessary to populate such object 20, and capturing population of an object 20 requires not only capturing the call that populated such object 20 but all calls that created and/or populated all prerequisite objects 20 of such object 20.

As may be appreciated, to capture all calls necessary to establish state for a particular frame n, one should know what objects 20 are relevant to such frame n. However, prior to (i.e., 'at the beginning of') frame n, such relevant objects 20 are unknown. Of course, such relevant frames 20 are known after frame n has been rendered (i.e. 'at the end of frame n'), but some of the relevant objects 20 may have become dirtied by rendering the frame n, with the result being that correctly noting population of such objects 20 is difficult. Accordingly, in one embodiment of the present invention, creating and populating objects 20 of the frame n is performed on demand according to calls, and each call is noted in a run file 22 (FIG. 2). Moreover, prior to each call that references an object 20, the present invention inserts into the run file 22 all calls necessary to create and populate the object 20, including all calls necessary to create and populate prerequisite objects 20 of the object 20, presuming each such prerequisite object 20 is not already created/populated in connection with frame n.

Of course, some recursion is incumbent in such a process in that before inserting the calls to build an object 20, the calls to build all prerequisite objects 20 are inserted, and the levels of dependency for an object 20 may indeed extend several generations. Such recursion also results in calls for establishing state for the frame being intermingled with calls that were actually made during and for frame n. Thus, the ordered calls in a run file 22 for a particular frame n may at least conceptually appear as:

---

Call
Call
To Create Object A:
  Call
  Call
  To Create Object B:
    Call
    Call
    Call
  To Populate Object B:
    Call
    Call
    Call
  Call
To Populate Object A:
  Call
  To Create Object C:
    Call
    Call
    Call
  To Populate Object C:
    Call
    Call
    Call
  Call
  Call
Call (using Object A)
Etc.

--- where only the left-most calls were actually made during the frame n and all indented calls are to establish state.

To know for any object 20 the prerequisite objects 20 thereof and the calls executed in creating and populating same, it is presumed that appropriate information is maintained. For example, such information may comprise lists or databases of appropriate form, or may merely comprise a recording of all previous calls, where such recording can be searched as necessary. At any rate, locating all calls necessary for prerequisite objects 20 of an object 20 is known or should be apparent to the relevant public and therefore need not be set forth herein in any detail. Thus, any appropriate method for locating all calls necessary for prerequisite objects 20 of an object 20 may be performed without departing from the spirit and scope of the present invention.

Note that in the course of constructing the run file 22, some calls can be safely left out, especially in cases where a particular call is a waste of effort. For example, it may at times be unnecessary to populate an object when establishing state for a frame n, such as when the object is going to be re-populated during the frame n. In general, it can be presumed that calls to create objects can never be left out from the run file 22, but instead should be copied into such run file 22 from an appropriate recording of calls made. However, calls to populate objects can at times be left out. In fact, where appropriate, a call to populate an object can be synthesized based on previous calls to populate the object and appropriate rules. Such synthesizing of calls to populate objects is known or should be apparent to the relevant public and therefore need not be set forth herein in any detail. Thus, any appropriate method for synthesizing such a populating call may be performed without departing from the spirit and scope of the present invention.

In inserting each call into a run file 22 for a frame n to record such frame n, and as may be appreciated, each call may be represented as a call package. In particular, such a call package may include a representation of the call made, each object 20 upon which the call is made, whether the call succeeded, parameters attached to the call, and the like. As used herein, then, the terms 'call' and 'call package' may be considered to be interchangeable unless circumstances dictate otherwise.

Once a run file 22 with all calls necessary to re-render a frame n is developed, actual re-rendering may be accomplished in a relatively straightforward matter by merely playing the run file 22 to issue each call therein in the order set forth. An executable 26 (FIG. 2) for playing such run file 22 may be any appropriate executable without departing from the spirit and scope of the present invention, presuming of course that such executable 26 can in fact issue the calls set forth within the run file 22. Notably, with such run file 22 and executable 26, the application 16 that originally rendered the frame n need not be present or operating, and the run file 22 and executable 26 may be employed on any appropriate computing device 14 to re-render the frame n on such computing device 14. Assuming the run file 22 has been constructed to contain the correct calls in appropriate order, it should be expected that prior to issuing a call in connection with the frame n, all required objects 20 in connection with the call already exist in an appropriate state, and accordingly such call can safely be executed.

To summarize thus far, then, in the present invention, calls made by an application 16 to a graphics interface 28 to render a visual simulation 10 on a corresponding display 12 are monitored, and packaged representations of such calls are stored to a data file. Each such package includes a corresponding call and necessary data referenced by the call. To capture a particular frame, then, the calls made in connection with such particular frame are captured, along with a sequence of calls made in connection with previous frames that set up state properly so that the calls made in connection with the particular frame have the intended original effect on the resulting rendered image. Thus, all of such calls may be re-executed in an appropriate order to re-render the particular frame. Significantly, by operating only at the level of the standard calls that are made to the graphics interface 28, capturing and re-rendering may be performed in connection with any application 16 that uses the standard graphics interface 28, without any need to modify the application 16 or understand any higher-level abstractions used by the application 16. In fact, inasmuch as the present invention relies only on the standard calls output by the application 16, access to the source code of the application is believed to be unnecessary.

Call Capturing Algorithm to Create Run File 22 for Frame N

Figure 3:
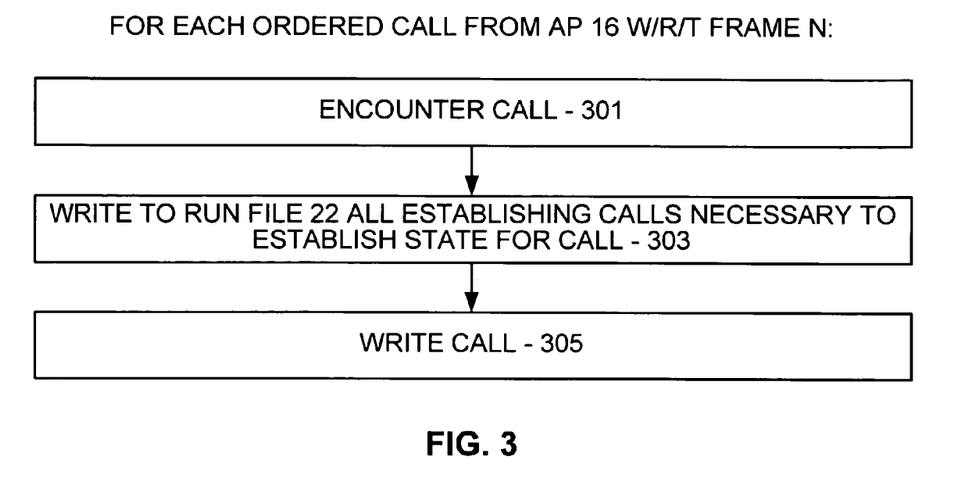
FIGS. 3-6 are flow diagram showing key steps performed in capturing calls necessary to re-render a particular frame of the visual presentation of FIG. 2 in accordance with one embodiment of the present invention.

Turning now to FIG. 3, it is presumed that a developer developing an application 16 with a visual simulation 10 wishes to capture a particular frame n of the simulation 10 for re-rendering of the frame 10, and in particular wishes to create a run file 22 with all calls necessary to re-render the frame 10 in an independent manner. Upon identifying the frame n to an appropriate capturing tool 24 (FIG. 2), then, the capturing tool 24 employs the algorithm set forth below.

Note that such capturing tool 24 may be any appropriate tool without departing from the spirit and scope of the present invention, presuming that such capturing tool 24 is appropriately coupled to the application 16 to monitor same for calls issued thereby, and presuming that such capturing tool 24 can perform the operations set forth below. Note that in the course of operation, the capturing tool 24 may encounter a large number of calls from the application 16 in a relatively short period of time. Accordingly, the capturing tool 24 should be capable of processing such calls in an expeditious manner. For example, the capturing tool 24 may be capable of real-time operation to digest the calls from the application 16 and generate the run file 22, or may record all calls made by the application 16 for later playback and generation of the run file 22. Alternately, it may be the case that the application 16 is run in a slow mode so that the capture tool can appropriately digest the calls therefrom.

As was alluded to above, the application 16 is run to generate frames 1 to n-1, and the capturing tool 24 in the course of the application 16 generating frames 1 to n-1 may record certain information, such as for example all calls made by the application 16, or a subset thereof, and/or may create certain lists or tables to identify prerequisite objects 20, calls to create prerequisite objects, etc. In pertinent part, then, upon the application 16 reaching frame n, the capturing tool 24 captures in a run file 22 for the frame n each call issued in connection with such frame n by the application, along with calls necessary to establish state, all in the following manner.

Still referring to FIG. 3, for each ordered call issued by the application 16 in connection with frame n, the capturing tool 24 upon encountering the call (step 301) first writes to the run file 22 all establishing calls necessary to establish state for the call (step 303), and then writes the call itself (step 305). Of course, writing all establishing calls necessary to establish state for the call as at step 303 likely represents the bulk of the processing work performed, while writing the call itself as at step 305 likely represents an almost-perfunctory final portion of such work.

In particular, for the call, writing all establishing calls necessary to establish state for the call as at step 303 requires that, for each object 20 upon which the call is made or that is a parameter of the call, the capturing tool 24 must write all calls necessary to establish such object 20, both in terms of creating and populating such object 20. In particular, and referring now to FIG. 4, the capturing tool 24 first determines for the object 20 whether such object 20 has already been created in connection with the run file 22 for the frame n (step 401). That is, the capturing tool 24 refers to other information such as state information regarding all objects 20 created in connection with the frame n to determine whether a call to create the object 20 already exists in the run file 22, and if so created, nothing more need be done with regard to such object 20 in connection with the call (step 403). Presumably, the call to create the object 20 that already exists in the run file 22 should be accompanied by a call to populate the object 20.

If, however, it is the case that the capturing tool 24 determines that a call to create the object 20 does not already exist in the run file 22, the capturing tool 24 in fact has each call needed to create such object 20 written into the run file 22 (step 405) and then has each call needed to populate such object 20 written into the run file 22 (step 407). Collectively, then, the steps of FIG. 4 may be described as 'attaining' the object 20 by either determine that the object 20 has already been created in connection with the run file 22 for the frame n or by writing all calls need to create and populate such object 20 into the run file 22. Again, writing each creating call for the object 20 into the run file 22 as at step 405 is likely performed based on a recording of a call that was previously issued in connection with a previous frame, while writing each populating call for such object 20 into the run file 22 as at step 407 is likely performed based on synthesizing an appropriate call based on one or more calls that were previously issued in connection with previous frames.

Figure 4:
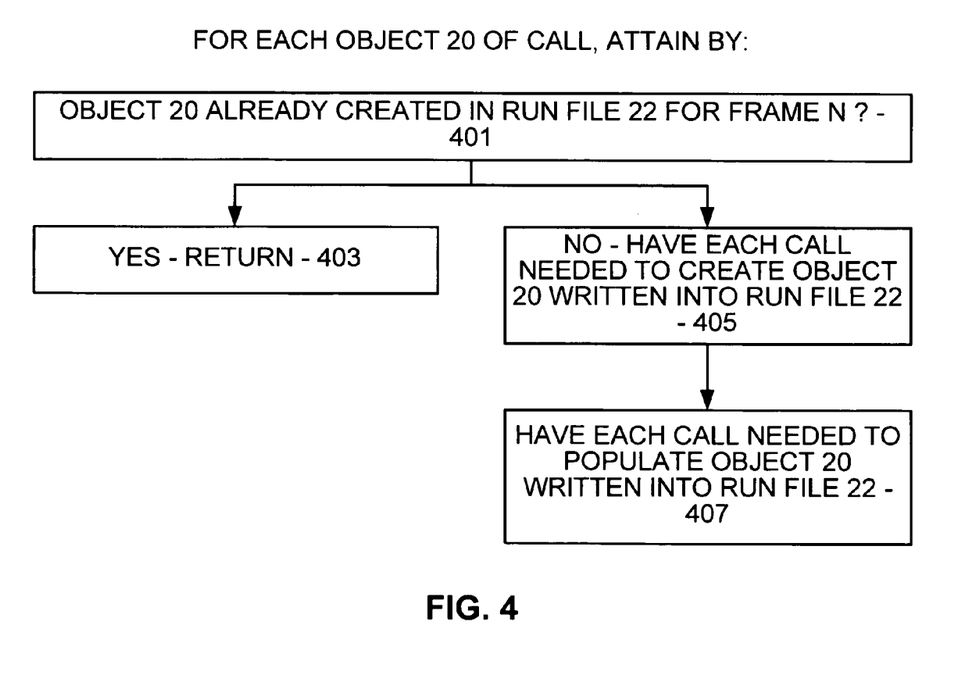
Figure 5:
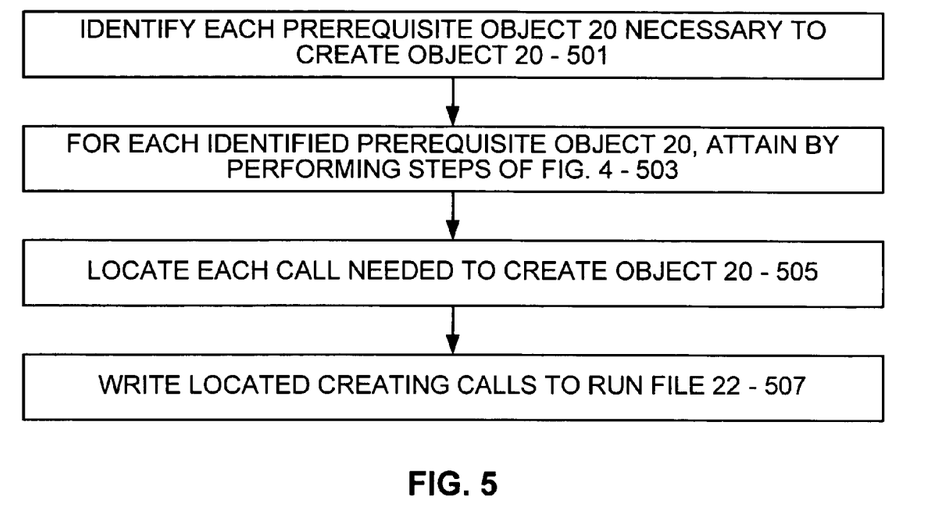

In particular, to write each creating call into the run file 22 for the object 20 as at step 405, and turning now to FIG. 5, the capturing tool 24 first identifies each prerequisite object 20 necessary to create the object 20 (step 501), and then for each identified prerequisite object 20, the capturing tool 24 performs the steps of FIG. 4 to attain the identified prerequisite object 20 by either determining that the identified prerequisite object 20 has already been created in connection with the run file 22 for the frame n or by writing the creating and populating calls into the run file 22 for same (step 503). Once each identified prerequisite object 20 for creating the object 20 at issue has been attained as at step 503, the capturing tool 24 then locates each call needed to create such object 20 (step 505), and in fact writes such creating calls to such run file 22 (step 507). Again, for creating an object 20, the capturing tool 24 likely re-uses creation calls previously made in connection with frames 1 to n-1.

As may now be appreciated, if an object 20 has several generations of prerequisite creating objects 20, where each generation may have one or more siblings, each generation may be represented as a nested recursion of the attaining steps of FIG. 4 or a series of nested recursions of such attaining steps of FIG. 4. Thus, if a particular object A has two prerequisite creating objects B and C not already created and each such prerequisite object B and C in turn has two prerequisite creating objects D and E and F and G, respectively, all not already created, the calls to create object A are not written to the run file 22 until the calls to create B and C are so written, the calls to create object B are not written to the run file 22 until the calls to create D and E are so written, and the calls to create object C are not written to the run file 22 until the calls to create F and G are so written, with the result being that the calls to create the objects A-G are written in the order of D E B F G C A.

Figure 6:
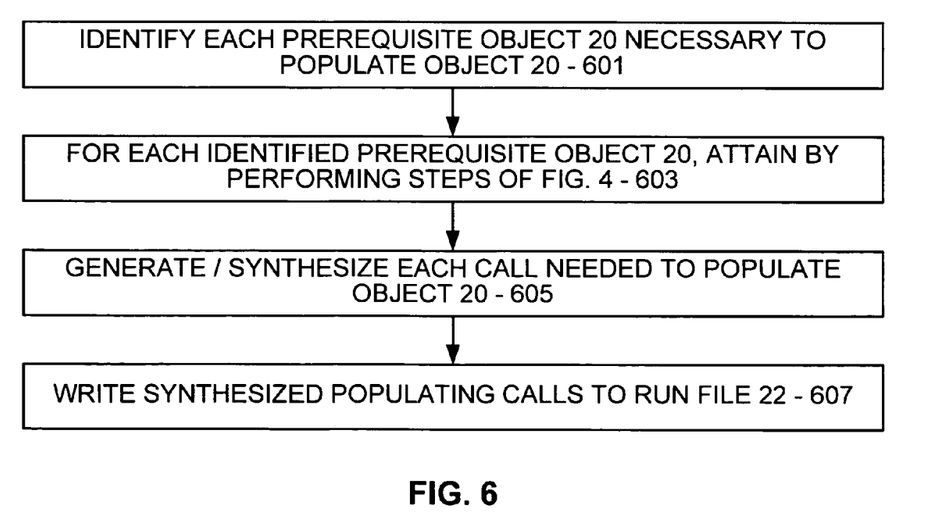

To write each populating call into the run file 22 for the object 20 as at step 407, and turning now to FIG. 6, and similar to the process shown in FIG. 5, the capturing tool 24 first identifies each prerequisite object 20 necessary to populate the object 20 (step 601), and then for each identified prerequisite object 20, the capturing tool 24 performs the steps of FIG. 4 to attain the identified prerequisite object 20 by either determining that the identified prerequisite object 20 has already been created in connection with the run file 22 for the frame n or by writing the creating and populating calls into the run file 22 for same (step 603). Once each identified prerequisite object 20 for populating the object 20 at issue has been attained as at step 603, the capturing tool 24 then generates each call needed to populate such object 20 (step 605), and in fact writes such populating calls to such run file 22 (step 607). Again, for populating an object 20, the capturing tool 24 likely synthesizes the populating calls inasmuch as many of the populating calls previously made in connection with frames 1 to n-1 may be unnecessary in connection with frame n.

As may similarly be appreciated, if an object 20 has several generations of prerequisite populating objects 20, where each generation may have one or more siblings, each generation may be represented as a nested recursion of the attaining steps of FIG. 4 or a series of nested recursions of such attaining steps of FIG. 4. Of course, such nested recursions include both recursions in connection with prerequisite creating objects 20 and prerequisite populating objects 20, and can grow quite complex.

At any rate, and again, all of the steps of FIGS. 4-6 and all the recursions incumbent therein ultimately result in all calls necessary to establish state being written to the run file 22, as at step 303, so that a call made in connection with the frame n can then be written to the run file 22 as at step 305. As should be now be appreciated, the steps of FIG. 3, and by extension the various recursions of the steps of FIGS. 4-6, are repeated for each ordered call issued by the application 16 in connection with the frame n, until a run file 22 is produced that represents the ordered calls from the application 16 along with all calls necessary to establish state for each ordered call, all in a sequence that when run by the aforementioned executable 26 allows the frame n to be re-rendered on any particular computing device 14 capable of so rendering such frame n based on such calls in such run file 22. Thus, such frame n may be re-rendered on any of a plurality of hardware and/or software configurations for purposes of testing, troubleshooting, and the like.

EXAMPLE

Following is an example illustrating operation of the call capturing algorithm set forth in connection with FIG. 3-6. As may be appreciated, the example is grossly oversimplified but is nevertheless illustrative. Presume that the aforementioned capturing tool 24 has been set to create a run file 22 that may be employed to re-render a frame 100 from a visual simulation 10 as output by an application 16 on a particular computing device 14, and that all relevant frames 1-100 include the following, as set forth in pseudo-code with attached explanation:

| FRAME | PSEDO-CODE | EXPLANATION |
|---|---|---|
| 1 | create ( DEV ) | Create an object named 'DEV' |
| 2 | TEX1 = createtexture ( DEV ) | Object TEX1 is created as a texture by calling 'createtexture' function on DEV object |
| 10 | fill ( TEX1 , red ) | Texture object TEX1 is filled with the color red |
| 50 | fill ( TEX1 , blue ) | Texture object TEX1 is filled with the color blue |
| 100 | draw ( triangle, TEX1) | Draw a triangle and populate the triangle with the texture object TEX1 |

Note preliminarily that although we are interested in frame 100 and the calls thereof, the calls made in connection with frames 1, 2, 10, and 50 may be necessary for establishing state in connection with frame 100. On further inspection, though, it should be evident that the populating call made in frame 10 (fill TEX1 with red) is irrelevant in that the result of such call is overwritten by the populating call made in frame 50 (fill TEX1 with blue).

At any rate, in performing the call capturing algorithm with regard to the (single) call at issue of frame 100, such single call is encountered as at step 301, and the capturing tool 24 thus first writes to the run file 22 all establishing calls necessary to establish state for the call at issue as at step 303.

In particular, the capturing tool 24 based on two recursions of the steps of FIG. 4 determines that the call at issue requires the TEX1 object, which in turn requires the DEV object, which in turn requires no other object, and thus according to the steps of FIGS. 5 and 6 in connection with the second recursion of the steps of FIG. 4 writes necessary calls to the run file 22 to create and populate the DEV object:

create (DEV)

Note that in fact only the one create call is needed, as above, and no populating calls are needed inasmuch as the DEV object was apparently never populated. At any rate, now that the DEV object is created and populated according to the steps of FIGS. 5 and 6, the capturing tool 24 can return from the second recursion of the steps of FIG. 4 and according to such steps of FIGS. 5 and 6 in connection with the first recursion of the steps of FIG. 4 writes necessary calls to the run file 22 to create and populate the TEX1 object:

TEX1=createtexture (DEV)

fill (TEX1, blue)

Note here again that only the one create call is needed. Note also again that although two populating calls are available for the TEX1 object, the capturing tool 24 synthesizes a single populating call from only the second (blue) populating call inasmuch as such second call overwrites the result of the first (red) populating call. At any rate, now that the TEX1 object is created and populated according to the steps of FIGS. 5 and 6, the capturing tool 24 can return from the first recursion of the steps of FIG. 4, thus signifying that all calls for establishing state necessary for the call at issue have been written to the run file 22 as at step 303. Thereafter, and as should be appreciated, the capturing tool 24 then turns to step 305 and writes the call at issue of frame 100 to the run file 22:

draw (triangle, TEX1)

Inasmuch as frame 100 had only the single call at issue, the capturing tool 24 need not process any further calls in connection with such frame 100, and thus concludes by performing any finalizing and/or closing processes that may be necessary, with the result being that the entire run file 22 for frame 100 is as follows:

create (DEV)

TEX1=createtexture (DEV)

fill (TEX1, blue)

draw (triangle, TEX1)

Thus an executable 26 running such a run file 22 can re-render frame 100 as set forth above without the need to re-render frames 1-99 in order to establish state for such frame 100, and without the need for the application 16 that originally rendered such frame 100. Moreover, such run file 22 may be executed by such an executable 26 on any of several hardware and/or software configurations.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method by which a particular rendered frame 18 may be captured and re-rendered in an expeditious and efficient manner, and without the aid of the application 16 that initially rendered the frame 18. Such re-rendering is achieved without the presence of all calls made in connection with all previous frames. Instead, only those calls made in connection with previous frames 18 that are needed in connection with the particular frame 18 are stored, as well as the calls made in connection with the particular frame 18. Thus, the particular frame 18 may be re-rendered by playing a run file 22 containing such needed calls to re-establish state prior to the particular frame 18, and also containing the calls made in connection with the particular frame 18. Such a run file 22 may be played without the application 16 on one or more computing devices 14 to identify performance, correctness, and understanding issues as between different hardware configurations and software configurations.

It should be appreciated that changes could be made to the embodiments described above without departing from the inventive concepts thereof. For one example, although the present invention is set forth in terms of capturing calls to a graphics interface 28 to re-render a frame n, the present invention should not be limited to graphical rendering of frames but instead should be considered to include any other application where a particular step in a cumulative process of calls to an interface is to be captured and re-rendered. For another example, although the present invention is set forth in terms of capturing calls to a graphics interface 28 to re-render a complete frame n, the present invention should also be interpreted to include rendering a subset of the calls to achieve an intermediate result. In general then, it should be understood, therefore, that this invention is not limited to the particular embodiments disclosed, but it is intended to cover modifications within the spirit and scope of the present invention as defined by the appended claims.

The invention claimed is:

1. A method in combination with an application running on a computing device that renders a visual simulation to a display of the computing device, the application rendering the simulation as a series of visual frames according to a plurality of calls, the method for encapsulating a particular frame n of the simulation for re-rendering comprising steps of:
   receiving an identification of the frame n to be captured;
   creating a run file for the identified frame n to re-render the frame n independent from the application;
   capturing, for the frame n, a call issued in connection with the frame n by the application;
   determining, with regard to the issued call, an object upon which the issued call is made;
   determining a creating call to create the object, comprising determining that state information used to create the object is not found in another object created in connection with the frame n, the state information comprising a texture map, a vertex buffer, or a pixel shader;
   determining a first populating call used to populate the object, the first populating call being stored in a first frame of frames 1 to n-1;
   determining a second populating call used to populate the object, the second populating call being stored in a second frame of frames 1 to n-1; and
   in response to determining that a result of processing the second populating call overwrites a result of processing the first populating call, writing the frame n, the issued call, the creating call, and the second populating call into the run file without writing the first populating call into the run file, such that executing the run file reconstructs or replays the frame n without executing any of frames 1 to n-1.

2. The method of claim 1, further comprising:
   capturing the issued call, the creating call, and the second populating call and writing the run file in a real-time manner.

3. The method of claim 1, wherein determining the first populating call used to populate the object comprises:
   determining that the object has not already been populated in connection with the run file.

4. The method of claim 1, wherein determining the creating call to create the object comprises:
   determining that the creating call was previously issued in connection with a previous frame 1 to n-1.

5. The method of claim 1, wherein determining the second populating call used to populate the object comprises:
   identifying a prerequisite object necessary to populate the object;
   in response to determining that the identified prerequisite object has not already been represented by a synthesized call in the run file, synthesizing an appropriate call from one or more populating calls that were previously issued in connection with previous frames 1 to n-1.

6. The method of claim 5, wherein an object has a plurality of generations of prerequisite populating objects, at least one generation being represented as a nested recursion of a generation that precedes it.

7. The method of claim 1, further comprising:
   executing the run file, independently of any previous frame or other run file, to replay or reconstruct the frame n.

8. The method of claim 1, wherein receiving the indication of the frame n to be captured comprises:
   receiving the indication of the frame n to be captured, the frame n being rendered by an application, the application being run in a slow mode that is slower than a real-time operation of the application.

9. The method of claim 1, wherein the run file comprises a non-visual object used in connection with the frame n, the non-visual object comprising a list, a database, a table, or a set of formulas.

10. The method of claim 1, wherein determining a creating call to create the object comprises:
    identifying a prerequisite object necessary to create the object; and
    in response to determining that the identified prerequisite object has not already been created in connection with the run file, writing the prerequisite object creating call to the run file.

11. The method of claim 10, wherein an object has a plurality of generations of prerequisite creating objects, at least one generation being represented as a nested recursion of a generation that precedes it.

12. A computer readable storage device, having stored thereon computer-executable instructions implementing operations in combination with an application running on a computing device that renders a visual simulation to a display of the computing device, the application rendering the simulation as a series of visual frames according to a plurality of calls, the operations for encapsulating a particular frame n of the simulation for re-rendering comprising:
    receiving an identification of the frame n to be captured, the frame n being rendered by an application;
    creating a run file for the identified frame n to re-render the frame n independent from the application;
    capturing, for the frame n, a call issued in connection with the frame n by the application;

determining, with regard to the issued call, an object upon which the issued call is made;

determining a creating call to create the object, comprising determining that state information used to create the object is not found in another object created in connection with the frame n, the state information comprising a texture map, a vertex buffer, or a pixel shader;

determining a first populating call used to populate the object, the first populating call being stored in a first frame of frames 1 to n-1;

determining a second populating call used to populate the object, the second populating call being stored in a second frame of frames 1 to n-1; and in response to determining that a result of processing the second populating call overwrites a result of processing the first populating call, writing the frame n, the issued call, the creating call, and the second populating call into the run file without writing the first populating call into the run file, such that executing the run file reconstructs or replays the frame n without executing any of frames 1 to n-1.

13. The computer readable storage device of claim 12, wherein the operations further comprise:

capturing the issued call, the creating call, and the second populating call and writing the run file in a real-time manner.

14. The computer readable storage device of claim 12, wherein determining the first populating call used to create the object comprises:

determining that the object has not already been populated in connection with the run file.

15. The computer readable storage device of claim 12, wherein determining the creating call to create the object comprises:

determining that the creating call was previously issued in connection with a previous frame 1 to n-1.

16. The computer readable storage device of claim 12, wherein determining a creating call to create the object comprises:

identifying a prerequisite object necessary to create the object;

in response to determining that the identified prerequisite object has not already been created in connection with the run file, writing the prerequisite object creating call to the run file.

17. The computer readable storage device of claim 12, wherein determining the second populating call used to populate the object comprises:

identifying each prerequisite object necessary to populate the object;

in response to determining that the identified prerequisite object has not already been represented by a synthesized call in the run file, synthesizing an appropriate call from one or more populating calls that were previously issued in connection with previous frames 1 to n-1.

18. The computer readable storage device of claim 12, wherein receiving the indication of the frame n to be captured comprises:

receiving the indication of the frame n to be captured, the frame n being rendered by an application, the application being run in a slow mode that is slower than a real-time operation of the application.

19. The computer readable storage device of claim 12, wherein the run file comprises a non-visual object used in connection with the frame n, the non-visual object comprising a list, a database, a table, or a set of formulas.

20. A system, comprising:

a processor; and a memory communicatively coupled to the processor, the memory bearing processor-executable instructions, that when executed on the processor, cause the processor to perform operations comprising:

receiving an identification of the frame n to be captured;

creating a run file for the identified frame n to re-render the frame n independent from the application;

capturing, for the frame n, a call issued in connection with the frame n by the application;

determining, with regard to the issued call, an object upon which the issued call is made;

determining a creating call to create the object, comprising determining that state information used to create the object is not found in another object created in connection with the frame n, the state information comprising a texture map, a vertex buffer, or a pixel shader;

determining a first populating call used to populate the object, the first populating call being stored in a first frame of frames 1 to n-1;

determining a second populating call used to populate the object, the second populating call being stored in a second frame of frames 1 to n-1;

in response to determining that a result of processing the second call overwrites a result of processing the first populating call, writing the frame n, the issued call, the creating call, and the second populating call into the run file without writing the first populating call into the run file, such that executing the run file reconstructs or replays the frame n without executing any of the frames 1 to n-1.

* * * * *